US010946858B2

(12) United States Patent
Sato et al.

(10) Patent No.: US 10,946,858 B2
(45) Date of Patent: Mar. 16, 2021

(54) TRAVEL CONTROL METHOD AND TRAVEL CONTROL APPARATUS

(71) Applicant: Nissan Motor Co., Ltd., Yokohama (JP)

(72) Inventors: Ko Sato, Kanagawa (JP); Masahiro Kobayashi, Kanagawa (JP); Yasuhisa Taira, Kanagawa (JP); Osamu Fukata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 205 days.

(21) Appl. No.: 16/316,836

(22) PCT Filed: Jun. 13, 2017

(86) PCT No.: PCT/JP2017/021747
§ 371 (c)(1),
(2) Date: Jan. 10, 2019

(87) PCT Pub. No.: WO2018/012179
PCT Pub. Date: Jan. 18, 2018

(65) Prior Publication Data
US 2019/0299988 A1    Oct. 3, 2019

(30) Foreign Application Priority Data
Jul. 12, 2016  (JP) .............................. JP2016-138027

(51) Int. Cl.
*B62D 1/28* (2006.01)
*G08G 1/16* (2006.01)
*B60W 30/12* (2020.01)
*B60W 40/06* (2012.01)
*B60W 30/165* (2020.01)
(Continued)

(52) U.S. Cl.
CPC .......... *B60W 30/12* (2013.01); *B60W 30/165* (2013.01); *B60W 40/06* (2013.01); *B60W 50/0097* (2013.01); *B62D 6/00* (2013.01); *B62D 15/025* (2013.01); *B62D 15/026* (2013.01); *G08G 1/16* (2013.01); *G08G 1/167* (2013.01);
(Continued)

(58) Field of Classification Search
CPC ....... B60W 30/12; B60W 30/165; B62D 6/00; B62D 1/28; B62D 101/00; B62D 113/00; G08G 1/16; G08G 1/167
See application file for complete search history.

(56) References Cited

U.S. PATENT DOCUMENTS 9,849,878 B2 *  12/2017  Lee ....................... B60W 30/12
2010/0295668 A1   11/2010  Kataoka
(Continued)

FOREIGN PATENT DOCUMENTS

DE    102006058412 A1    6/2008
JP        H04306709 A    10/1992
(Continued)

*Primary Examiner* — Tan Q Nguyen
(74) *Attorney, Agent, or Firm* — Young Basile Hanlon & MacFarlane, P.C.

(57) ABSTRACT

A travel control apparatus, when a lane line of the traffic lane that had been being detected is no longer detected, estimates an imaginary lane line based on the position of the lane line detected in the past and controls the travel of the host vehicle such that the host vehicle is at a predetermined position with respect to the imaginary lane line.

7 Claims, 4 Drawing Sheets

(51) Int. Cl.
  *B62D 6/00* (2006.01)
  *B62D 15/02* (2006.01)
  *B60W 50/00* (2006.01)
  *B60Q 9/00* (2006.01)

(52) U.S. Cl.
  CPC ........... *B60Q 9/00* (2013.01); *B60W 2554/80* (2020.02); *B60W 2554/801* (2020.02)

(56) References Cited

U.S. PATENT DOCUMENTS

| | | | |
|---|---|---|---|
| 2010/0324797 A1 | 12/2010 | Fritz | |
| 2012/0226392 A1* | 9/2012 | Kataoka | G08G 1/167 701/1 |
| 2012/0314070 A1* | 12/2012 | Zhang | B60W 40/00 348/148 |
| 2015/0165972 A1* | 6/2015 | Takemae | G06T 7/593 348/148 |
| 2016/0046290 A1* | 2/2016 | Aharony | B60W 10/04 701/41 |
| 2016/0110616 A1* | 4/2016 | Kawasaki | G06K 9/00798 382/103 |
| 2016/0121889 A1* | 5/2016 | Shimomura | B60W 50/14 701/41 |
| 2016/0325753 A1* | 11/2016 | Stein | G06K 9/46 |
| 2017/0053533 A1* | 2/2017 | Kuroda | G06K 9/00805 |
| 2018/0001894 A1* | 1/2018 | Masui | B60W 10/18 |

FOREIGN PATENT DOCUMENTS

| | | |
|---|---|---|
| JP | H10049672 A | 2/1998 |
| JP | 2004206275 A | 7/2004 |
| JP | 2007253723 A | 10/2007 |
| JP | 2009037541 A | 2/2009 |
| JP | 2010271999 A | 12/2010 |
| JP | 2011240816 A | 12/2011 |
| JP | 2015005132 A | 1/2015 |
| JP | 2016081362 A | 5/2016 |
| WO | 2011064825 A1 | 6/2011 |

* cited by examiner

TRAVEL CONTROL METHOD AND TRAVEL CONTROL APPARATUS

CROSS REFERENCE TO RELATED APPLICATION

The present application claims priority to Japanese Patent Application No. 2016-138027, filed Jul. 12, 2016, incorporated herein in its entirety.

TECHNICAL FIELD

The present invention relates to travel control methods and travel control apparatuses for controlling the travel of a vehicle.

BACKGROUND

There is known a technique for recognizing lane lines drawn on the road surface, making a vehicle travel along the traffic lane defined by the lane lines, and when the lane lines are not recognized, making the vehicle travel following a preceding vehicle (see Japanese Patent Application Publication No. 2004-206275).

However, if the vehicle simply follows the preceding vehicle; when the preceding vehicle does not travel along the traffic lane, the vehicle may not travel remaining at a predetermined position in the width direction of the traffic lane. This may degrade the accuracy of the control to make the vehicle travel along the traffic lane, what is called lane keeping control.

SUMMARY

In light of the above problem, an object of the present invention is to provide a travel control method and a travel control apparatus that are capable of performing the lane keeping control with high accuracy.

A travel control method according to an aspect of the present invention, when a lane line of the traffic lane that had been being detected is no longer detected, estimates an imaginary lane line based on the position of the lane line detected in the past and controls the travel of the host vehicle such that the host vehicle is at a predetermined position with respect to the imaginary lane line.

The present invention provides a travel control method and a travel control apparatus that are capable of performing lane keeping control with high accuracy.

DETAILED DESCRIPTION

Figure 1:
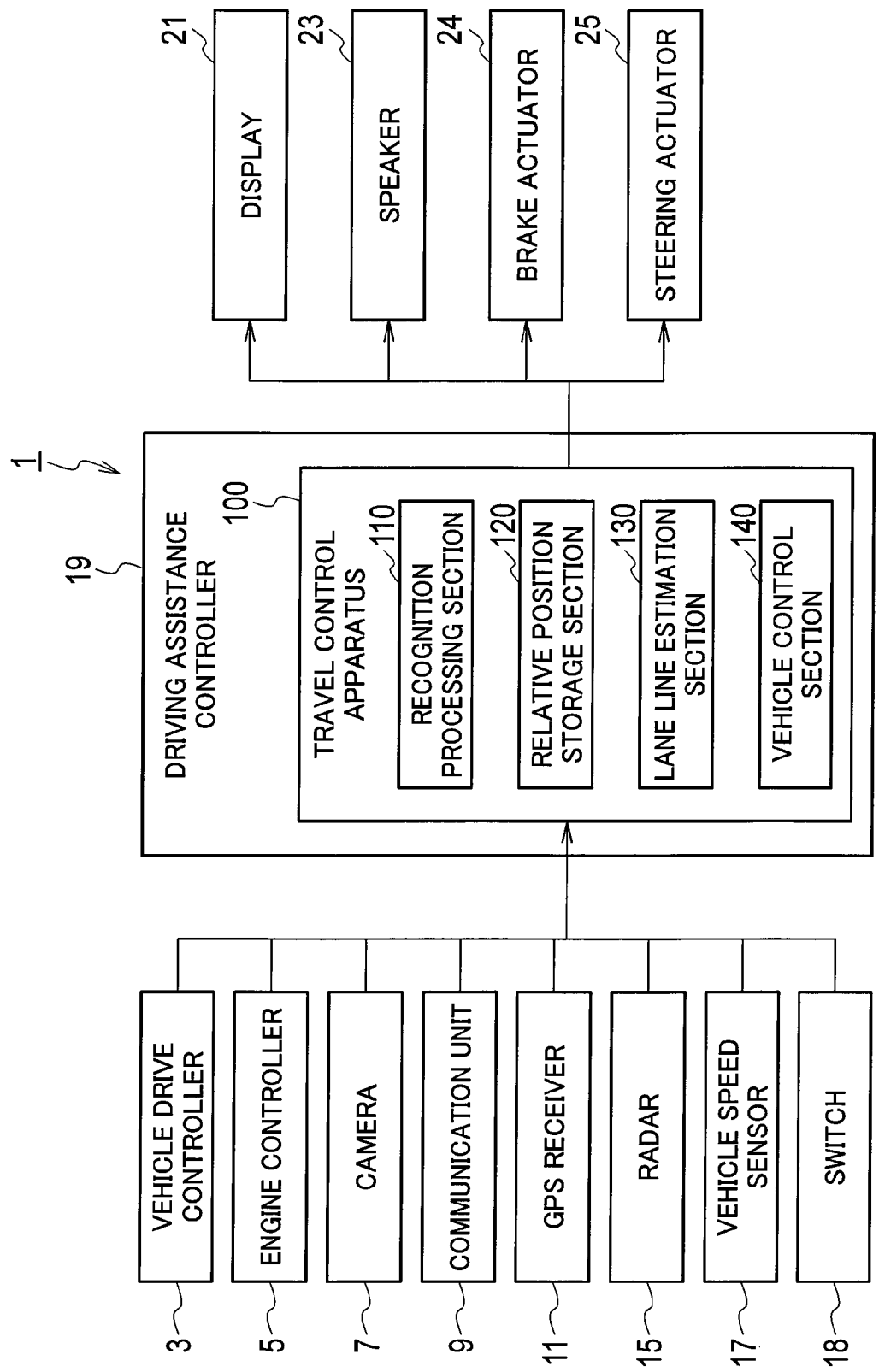
FIG. 1 is a block diagram for explaining a basic configuration of a travel control apparatus according to an embodiment of the present invention.

An embodiment of the present invention will be described with reference to the drawings. In the illustration in the drawings, the same or similar parts are denoted by the same or similar reference signs, and repetitive description thereof is omitted.

FIG. 1 is a block diagram illustrating the configuration of a travel control system 1 according to the embodiment of the present invention. The travel control system 1 includes a vehicle drive controller 3, engine controller 5, camera 7, communication unit 9, GPS receiver 11, radar 15, vehicle speed sensor 17, and switch 18. The travel control system 1 also includes a driving assistance controller 19, display 21, speaker 23, brake actuator 24, and steering actuator 25. The travel control system 1 is mounted on the host vehicle, which is equipped with a system that enables the host vehicle to travel following the preceding vehicle ahead of the host vehicle, such as adaptive cruise control.

The vehicle drive controller 3 includes a system that controls driving of the vehicle such as an anti-lock braking system, a traction control system, and vehicle dynamics control. The engine controller 5 is a controller that controls the engine. The camera 7 is an image sensor that captures images of the area ahead of the host vehicle and acquires images including the preceding vehicle and the lane lines of the traffic lane. The images acquired by the camera 7 are used for acquiring information such as the following distance and the relative speed to the preceding vehicle and the positions of the lane lines. The communication unit 9 is a communication device that performs transmission and reception on information communication services using road-to-vehicle communication or mobile phone lines. The GPS receiver 11 receives information on the latitude, longitude, and altitude of the host vehicle from satellites. The radar 15 measures the following distance and the relative speed between the preceding vehicle and the host vehicle using, for example, a millimeter wave sensor. The vehicle speed sensor 17 measures the vehicle speed of the host vehicle. The switch 18 is a switch for switching on and off the lane keeping mode in which the travel of the host vehicle is controlled such that the host vehicle travels at a predetermined position with respect to the lane lines of the traffic lane in which the host vehicle is traveling. The switch 18 is operated by the driver of the host vehicle. Note that the lane keeping mode is also switched off by the driver's intervention in the driving operation.

The driving assistance controller 19 controls driving assistance systems such as adaptive cruise control, emergency brakes, and auto-hold brakes. The driving assistance controller 19 may include a system for the adaptive cruise control with a steering control function added. The driving assistance controller 19 detects the presence of the preceding vehicle and the lane lines (lane detection) using the camera 7 and the radar 15, measures the following distance and the lateral position of the preceding vehicle with respect to the host vehicle or the lane lines, and sends instructions to the engine controller 5, brake actuator 24, steering actuator 25, and other units to control acceleration or deceleration, and steering of the host vehicle. The driving assistance controller 19, when there is no preceding vehicle, performs vehicle speed control that allows the host vehicle to travel keeping a set vehicle speed, and when there is a preceding vehicle, performs following-distance keeping control that allows the host vehicle to travel keeping the following distance to the preceding vehicle constant. When the preceding vehicle stops, the driving assistance controller 19 also stops the host vehicle and performs stop holding control. Note that in this embodiment, description is provided as an example for a driving assistance system that involves the driver's operations, but the present invention can also be applicable to an automated driving system less involving the driver's operations.

The display 21 displays the statuses of the systems, such as the adaptive cruise control, emergency brakes, and auto-hold brakes. The speaker 23, when the adaptive cruise control, emergency brakes, auto-hold brakes, and the like present information or give an alert by displaying and sound, outputs the sound. The brake actuator 24 performs brake operations for braking control of the host vehicle under instructions from the driving assistance controller 19. The steering actuator 25 performs steering operations for controlling the lateral position of the host vehicle under instructions from the driving assistance controller 19.

A travel control apparatus 100 is mounted on the host vehicle as a controller integrated with the driving assistance controller 19. The travel control apparatus 100 recognizes the traffic lane in which the host vehicle is traveling and controls the travel of the host vehicle such that the host vehicle is at a predetermined position with respect to the lane lines of the traffic lane (for example, at the center of the right and left lane lines). Specifically, the travel control apparatus 100 controls at least one of steering and braking of the vehicle such that the lateral position of the host vehicle is at a predetermined position with respect to the lane lines of the traffic lane. Here, the description will continue taking, as an example, the case where the travel control apparatus 100 controls steering of the vehicle by transmitting control signals to the steering actuator 25.

The travel control apparatus 100 is, for example, a general purpose microcomputer including a central processing unit (CPU), memory, and input-output unit. A computer program (travel control program) for causing the microcomputer to function as the travel control apparatus 100 is installed in the microcomputer and executed. This makes the general purpose microcomputer function as the travel control apparatus 100. Note that although here description is provided for an example in which the travel control apparatus 100 is implemented by software, it is a matter of course that the travel control apparatus 100 can be configured by preparing dedicated hardware for executing each information process described below. In addition, the units (110, 120, and 130) included in the travel control apparatus 100 may be implemented by individual pieces of hardware. Further, not only the travel control apparatus 100 but also each of the vehicle drive controller 3, engine controller 5, and driving assistance controller 19 can be implemented by software or dedicated hardware in a similar manner. Moreover, the travel control apparatus 100 may also serve as an electronic control unit (ECU) used for other control related to the vehicle.

The travel control apparatus 100 includes a recognition processing section 110, relative position storage section 120, lane line estimation section 130, and vehicle control section 140. The recognition processing section 110 recognizes the lane lines that define the traffic lane (own traffic lane) in which the host vehicle is traveling, from images acquired by the camera 7. The recognition processing section 110 calculates the relative positions of the lane lines to the preceding vehicle, for example, based on the relative position of the preceding vehicle to the host vehicle acquired by the radar 15 and the relative positions of the preceding vehicle and the lane lines to the host vehicle acquired by the camera 7. The relative position storage section 120 stores the relative positions of the lane lines to the preceding vehicle calculated by the recognition processing section 110. The lane line estimation section 130, when lane lines are not detected because of a preceding vehicle ahead of the host vehicle, estimates imaginary lane lines based on relative positions of the lane lines to the host vehicle detected in the past. In this embodiment, the term "the past" means, while driving, some period immediately before the time when lane lines are no longer detected (for example, several seconds), and while stopping, the period after the host vehicle stops until the host vehicle starts. In other words, "the past" can be applicable to a period during which it is considered that the positions of lane lines to the host vehicle have not changed significantly whether it is in the past or in the present. The vehicle control section 140 controls the travel of the host vehicle, for example, steering of the host vehicle such that the lateral position of the host vehicle to the lane lines recognized by the recognition processing section 110 or the imaginary lane lines estimated by the lane line estimation section 130 is at a predetermined position. Specifically, the vehicle control section 140 transmits control signals to the steering actuator 25 to control steering torque outputted by the steering actuator (motor) 25. This enables the travel control apparatus 100 to control steering of the host vehicle.

Figure 2:
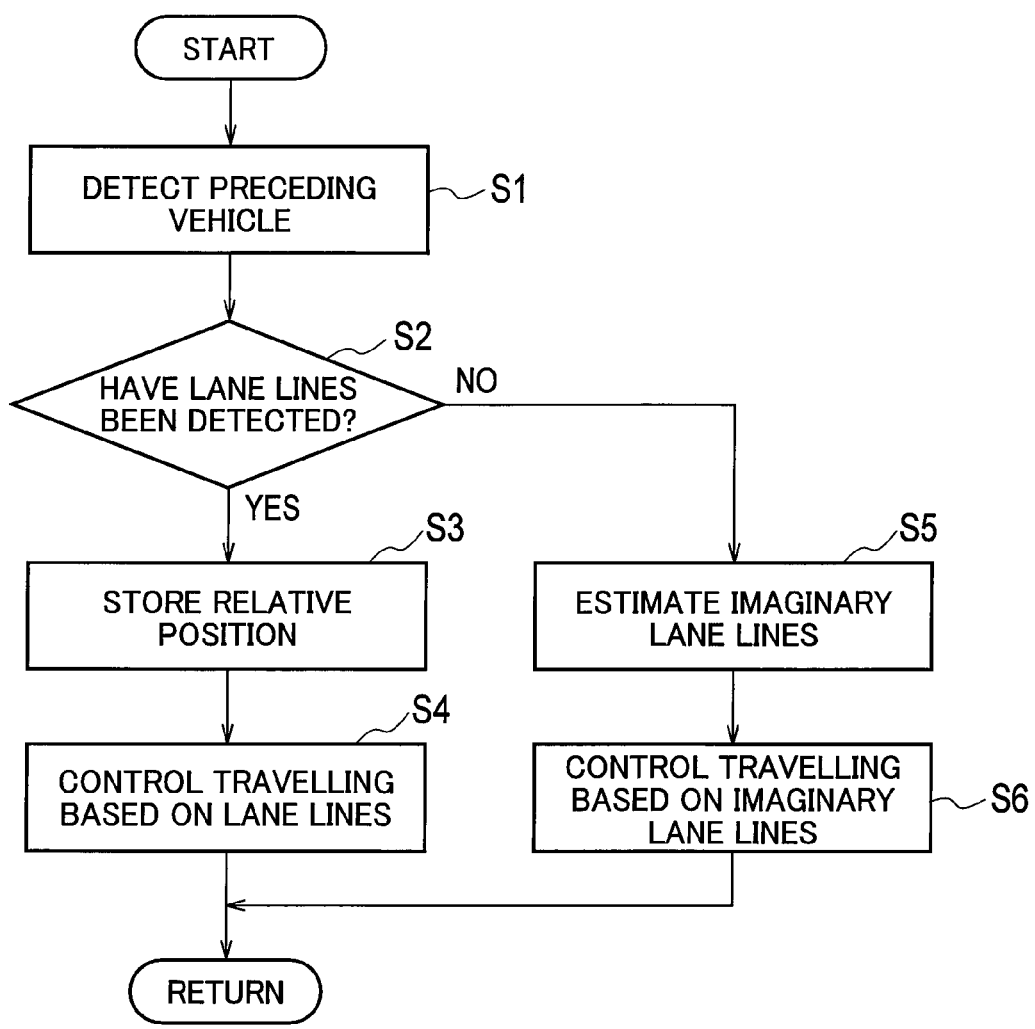
FIG. 2 is a flowchart illustrating an example of a travel control method using the travel control apparatus according to the embodiment of the present invention.
Figure 3:
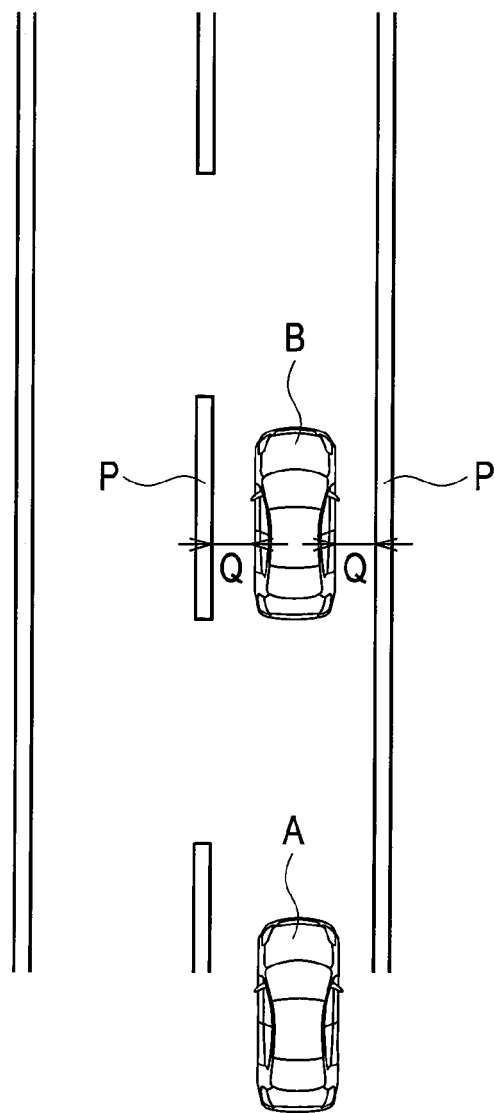
FIG. 3 illustrates an example of a scene where the travel control method using the travel control apparatus according to the embodiment of the present invention is applied.

With reference to FIG. 2, description will be provided for an example of a travel control method using the travel control apparatus 100. A series of processes illustrated in the flowchart of FIG. 2 starts by shifting to the lane keeping mode and is repeatedly executed at a predetermined cycle during the lane keeping mode. In the following, description will be provided for a scene where a preceding vehicle B is traveling in a predetermined distance range ahead of the host vehicle A in the traffic lane in which the host vehicle A is traveling, as illustrated in FIG. 3.

At step S1, the recognition processing section 110 detects the preceding vehicle B ahead of the host vehicle A, using at least images acquired by the camera 7 or distance measurement data acquired by the radar 15. Specifically, the recognition processing section 110 detects the relative position of the preceding vehicle B to the host vehicle A.

At step S2, the recognition processing section 110 determines whether the lane lines P of the traffic lane in which the host vehicle A is traveling have been detected from images acquired by the camera 7 that captures images of the area ahead of the host vehicle A. If the lane lines P have been detected, the process proceeds to step S3.

At step S3, the recognition processing section 110 calculates the relative positions of the lane lines P to the preceding vehicle B based on the relative position of the preceding vehicle B to the host vehicle A detected at step S1 and the lane lines P detected at step S2 and stores the calculated relative positions in the relative position storage section 120. Note that the relative positions stored in the relative position storage section 120 are updated at a predetermined cycle every time the recognition processing section 110 calculates the relative positions. This enables the relative position storage section 120 to always store the relative positions of the lane lines P to the preceding vehicle B at the latest position.

At step S4, the vehicle control section 140 controls the travel of the host vehicle A based on the lane lines P detected at step S2. Specifically, the vehicle control section 140 controls the steering of the host vehicle A by controlling the steering actuator 25 such that the host vehicle A is at a predetermined position with respect to the lane lines P detected by the recognition processing section 110.

Figure 4:
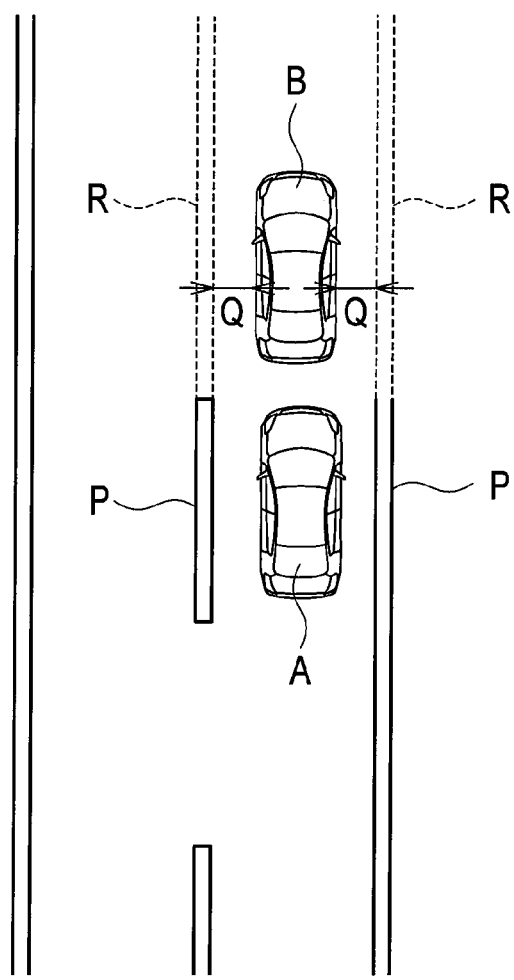
FIG. 4 illustrates an example of a scene where the following distance to the preceding vehicle is small in the travel control method using the travel control apparatus according to the embodiment of the present invention.

Meanwhile, when the following distance between the host vehicle A and the preceding vehicle B is smaller than a predetermined value, for example, as illustrated in FIG. 4, at least part of the lane lines P is hidden by the preceding vehicle B and cannot be detected by the camera 7 in some cases. As in this case, if the lane lines P are not detected at step S2, the process proceeds to step S5.

At step S5, the lane line estimation section 130 estimates imaginary lane lines R based on the relative positions stored in the relative position storage section 120. For example, assume that the relative position storage section 120 has stored distances Q from the sides of the preceding vehicle B as the relative positions of the lane lines P to the preceding vehicle B. In this case, the lane line estimation section 130 estimates that the imaginary lane lines R extending along the traveling direction of the host vehicle A or the preceding vehicle B are at the positions at the distances Q from the sides of the preceding vehicle B detected by the recognition processing section 110 at step S1 in the current processing cycle.

At step S6, the vehicle control section 140 controls the travel of the host vehicle A based on the imaginary lane lines R determined by the estimation at step S5. Specifically, the vehicle control section 140 controls steering of the host vehicle A by controlling the steering actuator 25 such that the host vehicle A is at a predetermined position with respect to the imaginary lane lines R determined by the lane line estimation section 130. The travel control may be configured such that the travel control stops when the lane lines are not detected within a predetermined range (time or distance) after starting to control the travel of the host vehicle such that the host vehicle is at a predetermined position with respect to the imaginary lane lines. Since the imaginary lane lines and the actual lane lines may differ after time passes, stopping the travel control can reduce the influence on the lane keeping control.

For example, in the case where the camera 7 is installed in the cabin of the host vehicle A, when the following distance between the host vehicle A and the preceding vehicle B is smaller than or equal to a predetermined value, the lane lines of the traffic lane in which the host vehicle A is traveling are not included in the angle of view of the camera 7 and may not be detected. Similarly, in the case where the host vehicle A is traveling on a highway, the lane lines may not be detected when the host vehicle is at a standstill or traveling at a slow speed because the interval of dashed line of the lane lines on a highway is larger than that of local roads.

The travel control apparatus 100 according to the embodiment of the present invention estimates imaginary lane lines based on the positions of the lane line detected in the past when the lane lines of the traffic lane that had been being detected are no longer detected. This enables the host vehicle to travel remaining at a predetermined position with respect to the imaginary lane lines, which improves the accuracy of the lane keeping control.

In addition, the travel control apparatus 100 according to the embodiment of the present invention, when the lane lines of the traffic lane in which the host vehicle is traveling are not detected, estimates the imaginary lane lines based on the relative position, currently being detected, of the preceding vehicle to the host vehicle and the relative positions, detected in the past, of the lane lines to the preceding vehicle. This enables the host vehicle to travel remaining a predetermined position with respect to the imaginary lane lines even when the preceding vehicle is traveling at a position shifted in the width direction of the traffic lane, which improves the accuracy of the lane keeping control. When the traffic lanes are hidden by the preceding vehicle and cannot be detected, it is likely that the following distance to the preceding vehicle is small. In this state, it is likely that the preceding vehicle is at a position in the extending direction of the traffic lane that the host vehicle is to reach after a predetermined time, and estimating as such improves the accuracy of the lane keeping control more.

In addition, the travel control apparatus 100 stores the positions of the lane lines detected in the past when the host vehicle stops. Then, if the lane lines are not detected when the host vehicle starts, the travel control apparatus 100 estimates the imaginary lane lines based on the stored positions of the lane lines. This enables the host vehicle to start traveling, keeping the high accuracy of the lane keeping control even when the lane lines are not detected.

In addition, even when the host vehicle stops in front of a red traffic signal or at traffic congestion, and then starts traveling automatically following the preceding vehicle without the lane lines detected, the travel control apparatus 100 estimates imaginary lane lines based on the relative positions of the lane lines to the preceding vehicle, detected in the past. This enables the host vehicle to start traveling, keeping the high accuracy of the lane keeping control even when the lane lines are not detected.

Although the embodiment of the present invention has been described as above, it should not be understood that the description and the drawings constituting part of this disclosure limit the present invention. From this disclosure, various alternatives, examples, and operation techniques will be apparent to those skilled in the art.

For example, the vehicle control section 140 may use the brake actuator 24 instead of the steering actuator 25 to perform control equivalent to steering of the host vehicle. In other words, the brake actuator 24 can turn the host vehicle right or left by applying the right and left brakes asymmetrically while the host vehicle is traveling.

In addition, the lane lines that the recognition processing section 110 detects are not limited to lane lines painted on the road surface but only need to be borders of the traffic lane. Specifically, examples of the lane lines that the recognition processing section 110 detects include road structures such as road shoulders, curbstones, and guardrails. In the case of detecting three-dimensional lane lines such as curbstones, the recognition processing section 110 detects the lane lines from three-dimensional distance measurement data acquired by the radar 15.

The functions described in the above embodiment can be implemented by one or more processing circuits. Examples of the processing circuits include programed processing apparatuses such as processing apparatuses including electric circuits. Examples of the processing circuits include apparatuses such as an application specific integrated circuit (ASIC) arranged to execute described functions, and circuit parts.

In addition to the above, it is a matter of course that the present invention includes various embodiments that are not described in this specification, such as configurations to which some of the constituents described in the above embodiment are appropriately applied. Thus, the technical scope of the present invention is determined only by the matters specifying the invention according to the claims, relevant to the above description.

REFERENCE SIGNS LIST 7 camera (sensor)
15 radar (sensor)
110 recognition processing section (recognition processing circuit)
120 relative position storage section
130 lane line estimation section (lane line estimation circuit)

140 vehicle control section (vehicle control circuit)
24 brake actuator
25 steering actuator

The invention claimed is:

1. A travel control method of controlling travel of a host vehicle such that the host vehicle is at a predetermined position with respect to a lane line of a traffic lane in which the host vehicle is traveling, the method comprising:
   when the lane line that had been being detected is no longer detected, estimating an imaginary lane line based on the position of the lane line detected in the past; and
   controlling the travel of the host vehicle such that the host vehicle is at a predetermined position with respect to the imaginary lane line, wherein
   when a preceding vehicle ahead of the host vehicle is being detected in the traffic lane, the imaginary lane line is estimated based on a relative position of the lane line to the preceding vehicle, detected in the past.

2. The travel control method according to claim 1, wherein
   when the host vehicle stops, the position of the lane line detected in the past is stored,
   when the host vehicle starts, and the lane line is not detected, an imaginary lane line is estimated based on the position of the lane line detected in the past, and
   the travel of the host vehicle is controlled such that the host vehicle is at a predetermined position with respect to the imaginary lane line.

3. The travel control method according to claim 1, wherein
   the relative position of the lane line to the preceding vehicle is a position at distance between a side of the preceding vehicle and the lane line on the side of the preceding vehicle.

4. The travel control method according to claim 1, wherein
   the imaginary lane line is estimated when distance between the host vehicle and the preceding vehicle is smaller than or equal to a predetermined distance.

5. The travel control method according to claim 1, wherein
   the imaginary lane line is estimated when the host vehicle is traveling on a highway.

6. The travel control method according to claim 1, wherein
   when the lane line is not detected for a predetermined time, estimating the imaginary lane line is stopped.

7. A travel control apparatus comprising:
   a vehicle control circuit that controls travel of a host vehicle such that the host vehicle is at a predetermined position with respect to a lane line of a traffic lane in which the host vehicle is traveling; and
   a lane line estimation circuit that, when the lane line that had been being detected is no longer detected, estimates an imaginary lane line based on the position of the lane line detected in the past, wherein
   when the lane line that had been being detected is no longer detected, the vehicle control circuit controls the travel of the host vehicle such that the host vehicle is at a predetermined position with respect to the imaginary lane line, and
   when a preceding vehicle ahead of the host vehicle is being detected in the traffic lane, the lane line estimation circuit estimates the imaginary lane line based on a relative position of the lane line to the preceding vehicle, detected in the past.

* * * * *